UNITED STATES PATENT OFFICE.

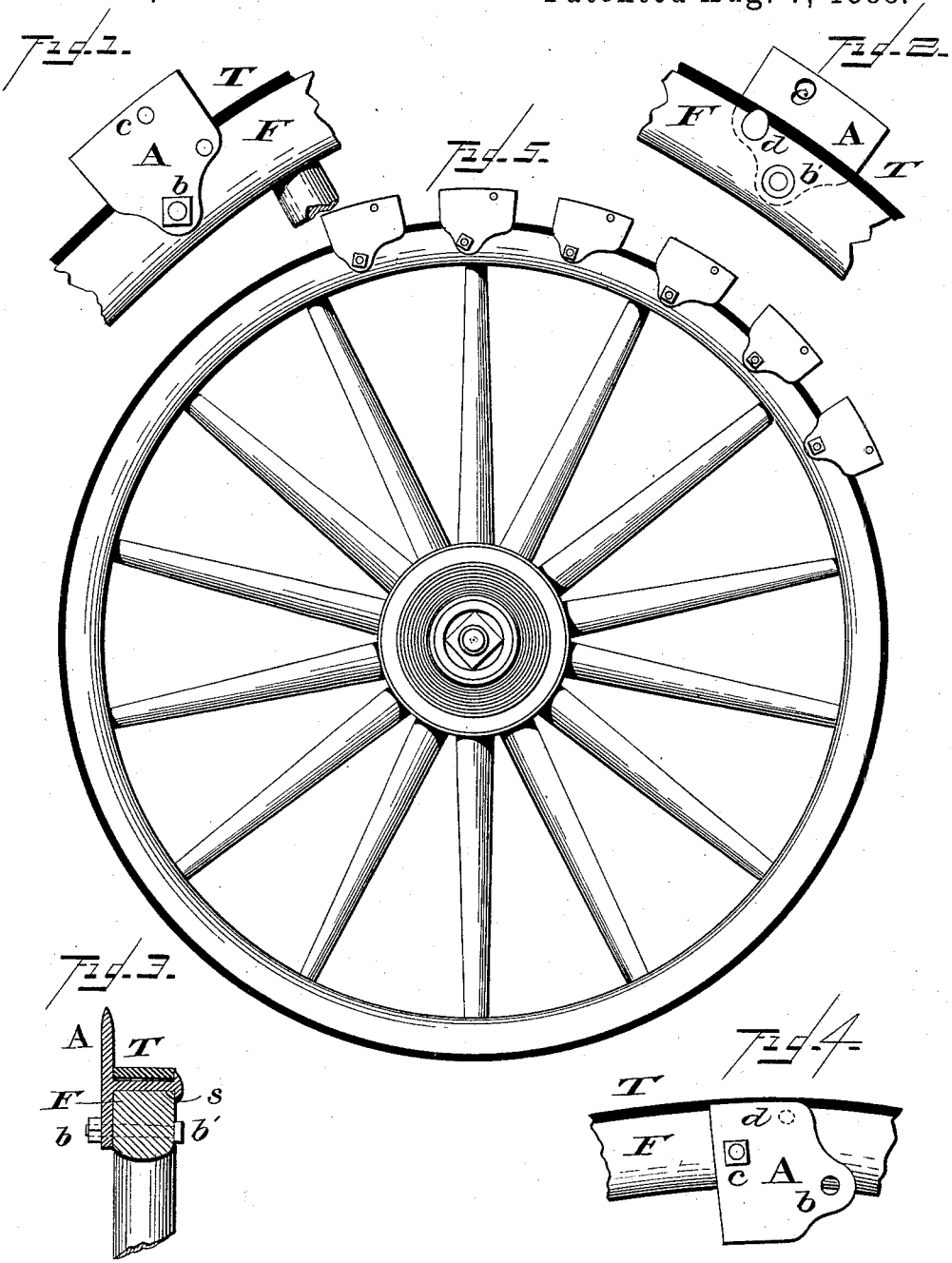

WILLIAM FLEMING, OF FORT WAYNE, INDIANA.

ROAD-GRADING MACHINE.

SPECIFICATION forming part of Letters Patent No. 387,348, dated August 7, 1888.

Application filed June 21, 1886. Serial No. 205,816. (No model.)

*To all whom it may concern:*

Be it known that I, WILLIAM FLEMING, a citizen of the United States, residing at Fort Wayne, in the county of Allen, in the State of Indiana, have invented certain new and useful Improvements in Road-Grading Machines; and I do hereby declare that the following is a full, clear, and exact description of the invention, which will enable others skilled in the art to which it appertains to make and use the same, reference being had to the accompanying drawings, which form part of this specification.

My invention is of a reversible flange-piece intended, primarily, for application to the wheels of a road-grading machine having a diagonally-placed scraper-bar, in the operation of which there is a side-thrust imparted to the machine which has to be provided against by some means, among which are flanges upon the wheels, which cut into the earth as the machine moves forward; but it is equally applicable to any wheel in which a flange-piece is employed to cut into the earth.

In the accompanying drawings, in which the same letters are employed to denote identical parts in all the figures, Figure 1 is a front view of the flange-piece in working position. Fig. 2 is a reverse view of the flange-piece in same position. Fig. 3 is a cross-section at the line $xx$ in Fig. 1. Fig. 4 is a view of the flange-piece reversed, and Fig. 5 is a wheel with some of its flange-pieces in position.

The flange-piece A is made of malleable cast-iron or of steel, as preferred, sharpened at its upper edge, with a solid fixed stem at $d$ extending through a gain in the felly F immediately under the tire T. This stem is shown in section at $s$ in Fig. 3, and it is provided with a solid flat head at $d'$, the length of the stem between the inner surfaces of the flange-piece F and the head $d'$ being made equal to the width of the tire T and the felly F. The flange-piece F is provided with two bolt-holes, (shown at $b$ and $c$ in Fig. 1,) equally distant from the center of the stem $s$, and so placed that when the flange-piece is bolted through $b$, as shown in Fig. 1, its upper edge will be parallel with the tire T, and when it is bolted through $c$, as shown in Fig. 4, the side of the flange-piece will partly cover the edge of the tire T. The head $d'$ of the flange-stem $s$ is cut away on one side, as shown in Fig. 2, so that when the flange is bolted to the felly in the position shown in Fig. 4 the tire can be put on or taken off from the wheel; but when the flange-piece is in the position shown in Fig. 1 the head $d'$ embraces the edge of the tire T and holds it in place.

The advantages of this construction are, first, that when the flange-piece is in working position, as in Fig. 1, it locks the tire firmly upon the wheel; and, second, that when it is desired to haul the machine idle under circumstances in which the flange-pieces would be an impediment they can be shifted to the position shown in Fig. 4, where they are clear of the ground and out of the way. This is accomplished by taking the bolt out of the bolt-hole $b$, turning the flange inwardly, and bolting it through $c$.

What I claim as novel, and desire to secure by Letters Patent, is—

1. In combination with the wheel of a road-grading machine, a reversible flange-piece adapted to be set on as a projecting flange by means of a fixed stem and a bolt, both passing through the felly, and to be set in position to clear the ground by turning it on its stem and bolting it in that position, substantially as described and set forth.

2. In combination with the wheel of a road-grading machine, a flange-piece turning by a stem passing through the felly and secured by a flattened head, and fastened by the same bolt in either of two positions at will—viz., as a projecting flange or turned inwardly to clear the ground.

3. In combination with the wheel of a road-grading machine, a flange-piece with a headed stem extending through the felly by a gain under the tire, and two bolt-holes, through one of which it may be bolted to the felly in position to stand as a projecting flange and lock the tire upon the felly, and through the other of which it may be bolted in position to clear the ground, substantially as described and set forth.

4. In combination with the wheel of a road-grading machine, the fixed stem $s$ and flange-piece A, as described and set forth.

5. In combination with the wheel of a road-grading machine, the flange-piece A, the headed stem $s$, and the bolt-holes $b$ and $c$, substantially as described and set forth.

In testimony whereof I do hereto subscribe my name, in the presence of two witnesses, this 16th day of June, A. D. 1886.

WILLIAM FLEMING.

Witnesses:
SAMUEL L. MORRIS,
WILLIAM L. PETTIT.